(12) United States Patent
Wu et al.

(10) Patent No.: US 8,071,835 B2
(45) Date of Patent: Dec. 6, 2011

(54) PROCESS TO PRODUCE POLYOLEFINS USING METALLOCENE CATALYSTS

(75) Inventors: Margaret May-Som Wu, Skillman, NJ (US); Norman Yang, Westfield, NJ (US); Mark Paul Hagemeister, Houston, TX (US); Shakeel Tirmizi, Matawan, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1143 days.

(21) Appl. No.: 11/789,871

(22) Filed: Apr. 26, 2007

(65) Prior Publication Data

US 2008/0020928 A1    Jan. 24, 2008

Related U.S. Application Data

(60) Provisional application No. 60/831,995, filed on Jul. 19, 2006.

(51) Int. Cl.
C07C 7/12    (2006.01)

(52) U.S. Cl. ........ 585/823; 585/820; 585/802; 585/809; 585/502; 585/520; 585/521; 585/522; 585/523

(58) Field of Classification Search ............... 528/482; 585/533, 824, 823, 820, 802, 809, 502, 520, 585/521, 522, 523; 210/502.1; 208/262.1, 208/251 R, 298, 299, 301
See application file for complete search history.

(56) References Cited

U.S. PATENT DOCUMENTS

| | | | |
|---|---|---|---|
| 2,978,442 A | 4/1961 | Brightbill et al. ............ 260/94.9 |
| 3,149,178 A | 9/1964 | Hamilton et al. | |
| 3,164,578 A | 1/1965 | Baker et al. .................. 260/94.9 |
| 3,382,291 A | 5/1968 | Brennan | |
| 3,742,082 A | 6/1973 | Brennan | |
| 3,769,363 A | 10/1973 | Brennan | |
| 3,780,128 A | 12/1973 | Shubkin | |
| 3,876,720 A | 4/1975 | Heilman et al. | |
| 3,883,417 A | 5/1975 | Woo et al. | |
| 4,016,349 A * | 4/1977 | McKenna .................... 528/482 |
| 4,132,663 A | 1/1979 | Heilman et al. | |
| 4,149,178 A | 4/1979 | Estes | |
| 4,172,855 A | 10/1979 | Shubkin et al. | |
| 4,180,575 A | 12/1979 | Rochling et al. | |
| 4,239,930 A | 12/1980 | Allphin et al. | |
| 4,263,465 A | 4/1981 | Sheng et al. | |
| 4,263,712 A | 4/1981 | Schroder | |
| 4,367,352 A | 1/1983 | Watts, Jr. et al. | |
| 4,413,156 A | 11/1983 | Watts, Jr. et al. | |
| 4,434,408 A | 2/1984 | Baba et al. | |
| 4,451,684 A | 5/1984 | Pasky | |
| 4,469,912 A | 9/1984 | Blewett et al. | |
| 4,587,368 A | 5/1986 | Pratt | |
| 4,701,489 A * | 10/1987 | Hughes et al. ................ 524/349 |
| 4,704,491 A | 11/1987 | Tsutsui et al. | |
| 4,827,064 A | 5/1989 | Wu | |
| 4,827,073 A | 5/1989 | Wu | |
| 4,892,851 A | 1/1990 | Ewen et al. | |
| 4,910,355 A | 3/1990 | Shubkin et al. | |
| 4,912,272 A | 3/1990 | Wu | |
| 4,914,254 A | 4/1990 | Pelrine | |
| 4,926,004 A | 5/1990 | Pelrine et al. | |
| 4,950,822 A | 8/1990 | Dileo et al. | |
| 4,956,122 A | 9/1990 | Watts et al. | |
| 4,962,262 A | 10/1990 | Winter et al. | |
| 4,967,032 A | 10/1990 | Ho et al. | |
| 4,990,709 A | 2/1991 | Wu | |
| 4,990,771 A | 2/1991 | Minoura et al. | |
| 5,012,020 A | 4/1991 | Jackson et al. | |
| 5,017,299 A | 5/1991 | Gutierrez et al. | |
| 5,017,714 A | 5/1991 | Welborn, Jr. | |
| 5,068,487 A | 11/1991 | Theriot | |
| 5,087,788 A | 2/1992 | Wu | |
| 5,177,276 A | 1/1993 | Beach et al. | |
| 5,186,851 A | 2/1993 | Gutierrez et al. | |
| 5,188,724 A | 2/1993 | Heilman et al. | |
| 5,220,100 A | 6/1993 | Massie et al. | |
| 5,264,642 A | 11/1993 | Wu | |
| 5,369,196 A | 11/1994 | Matsumoto et al. | |
| 5,382,739 A | 1/1995 | Atkins et al. | |
| 5,462,995 A | 10/1995 | Hosaka et al. | |
| 5,498,815 A | 3/1996 | Schaerfl, Jr. et al. | |
| 5,552,504 A * | 9/1996 | Bennett et al. ............. 526/348.1 |
| 5,637,400 A * | 6/1997 | Brekner et al. ............... 428/373 |
| 5,679,812 A | 10/1997 | Winter et al. | |
| 5,688,887 A | 11/1997 | Bagheri et al. | |
| 5,690,832 A * | 11/1997 | Tavlarides et al. ............ 210/661 |
| 5,705,577 A | 1/1998 | Rossi et al. ...................... 526/68 |

(Continued)

FOREIGN PATENT DOCUMENTS

EP    0 277 004    8/1988

(Continued)

OTHER PUBLICATIONS

"Adsorption and Ion Exchange" in Perry's Chemical Engineer's Handbook, 7th ed., R. H. Perry and D. W. Green, ed., McGraw-Hill (1997), available on-line at www.knovel.com.*

(Continued)

Primary Examiner — In Suk Bullock
Assistant Examiner — Bradely Etherton
(74) Attorney, Agent, or Firm — Nancy T. Krawczyk; Andrew B. Griffis

(57) ABSTRACT

The invention is directed to a process for producing polyolefins by one or more homogeneous or colloidal polymerization catalyst wherein residual catalyst is removed by using a solid sorbent.

24 Claims, No Drawings

U.S. PATENT DOCUMENTS

| | | | |
|---|---|---|---|
| 5,731,254 | A | 3/1998 | Winter et al. |
| 5,811,379 | A | 9/1998 | Rossi et al. |
| 5,846,896 | A | 12/1998 | Ewen |
| 5,852,143 | A | 12/1998 | Sishta et al. |
| 5,859,159 | A | 1/1999 | Rossi et al. ............... 526/176 |
| 6,043,401 | A | 3/2000 | Bagheri et al. |
| 6,087,307 | A | 7/2000 | Kaminski et al. |
| 6,133,209 | A | 10/2000 | Rath et al. |
| 6,147,271 | A | 11/2000 | Strebel et al. |
| 6,180,575 | B1 | 1/2001 | Nipe |
| 6,388,032 | B1 * | 5/2002 | Yamaura et al. ............ 526/160 |
| 6,414,090 | B2 | 7/2002 | Minami et al. |
| 6,414,091 | B2 | 7/2002 | Moritomi et al. |
| 6,479,722 | B1 | 11/2002 | De Wet et al. |
| 6,548,723 | B2 | 4/2003 | Bagheri et al. |
| 6,548,724 | B2 | 4/2003 | Bagheri et al. |
| 6,642,169 | B2 | 11/2003 | Weatherhead |
| 6,646,174 | B2 | 11/2003 | Clarembeau |
| 6,706,828 | B2 * | 3/2004 | DiMaio ...................... 526/160 |
| 6,713,438 | B1 | 3/2004 | Baillargeon et al. |
| 6,824,671 | B2 | 11/2004 | Goze et al. |
| 6,858,767 | B1 | 2/2005 | DiMaio et al. |
| 6,960,700 | B1 | 11/2005 | Sethna et al. ............... 585/822 |
| 7,060,768 | B2 | 6/2006 | Brookhart et al. ........... 526/161 |
| 7,129,197 | B2 | 10/2006 | Song et al. |
| 7,473,815 | B2 | 1/2009 | Lambert et al. |
| 7,544,850 | B2 | 6/2009 | Goze et al. |
| 7,547,811 | B2 | 6/2009 | Kramer et al. |
| 7,592,497 | B2 | 9/2009 | Yang et al. |
| 7,601,256 | B2 | 10/2009 | Beall |
| 2001/0041817 | A1 * | 11/2001 | Bagheri et al. ............... 585/517 |
| 2001/0041818 | A1 | 11/2001 | Bagheri et al. |
| 2003/0055184 | A1 | 3/2003 | Song et al. |
| 2004/0022508 | A1 | 2/2004 | Belardi et al. |
| 2004/0033908 | A1 | 2/2004 | Deckman et al. |
| 2004/0087746 | A1 | 5/2004 | Razavi |
| 2004/0097772 | A1 | 5/2004 | Deckers et al. |
| 2004/0147693 | A1 | 7/2004 | DiMaio |
| 2004/0220359 | A1 | 11/2004 | Abhari et al. |
| 2004/0230016 | A1 | 11/2004 | Blackbrow et al. |
| 2005/0059563 | A1 | 3/2005 | Sullivan et al. |
| 2005/0101761 | A1 * | 5/2005 | Lambert et al. ............... 528/503 |
| 2005/0183988 | A1 | 8/2005 | Freerks et al. |
| 2007/0000807 | A1 | 1/2007 | Wu et al. |
| 2007/0011832 | A1 | 1/2007 | Keidel et al. |
| 2007/0043248 | A1 | 2/2007 | Wu et al. .................... 585/521 |
| 2007/0208151 | A1 * | 9/2007 | Okada et al. ................ 526/226 |
| 2009/0005279 | A1 | 1/2009 | Wu et al. |
| 2009/0156874 | A1 | 6/2009 | Patil et al. |
| 2009/0281360 | A1 | 11/2009 | Knowles et al. |
| 2010/0069687 | A1 | 3/2010 | Kosover et al. |

FOREIGN PATENT DOCUMENTS

| | | |
|---|---|---|
| EP | 0 277 007 | 8/1988 |
| EP | 0 284 708 | 10/1988 |
| EP | 0 321 852 | 6/1989 |
| EP | 0 349 276 | 1/1990 |
| EP | 0 377 306 | 7/1990 |
| EP | 0 403 866 | 12/1990 |
| EP | 0 513 380 | 11/1992 |
| EP | 0 613 873 | 9/1994 |
| EP | 0 680 942 | 11/1995 |
| EP | 0 930 320 | 7/1999 |
| EP | 0 992 517 | 4/2000 |
| EP | 1 028 128 | 8/2000 |
| EP | 1 309 633 | 5/2003 |
| EP | 1 342 707 | 9/2003 |
| EP | 1607415 A1 * | 12/2005 |
| GB | 938 069 | 9/1963 |
| IN | 191553 | 12/2003 |
| JP | 6336590 | 12/1994 |
| JP | 2005-200446 | 7/2005 |
| WO | 96/23751 | 8/1996 |
| WO | 99/67347 | 12/1999 |
| WO | 00/58423 | 10/2000 |
| WO | 02/14384 | 2/2002 |
| WO | 03/009136 | 1/2003 |
| WO | 03/051943 | 6/2003 |
| WO | 03/071369 | 8/2003 |
| WO | 03/104292 | 12/2003 |
| WO | 2004/046214 | 6/2004 |
| WO | WO 2005103092 A1 * | 11/2005 |
| WO | 2007/011459 | 1/2007 |
| WO | 2007/011462 | 1/2007 |
| WO | 2007/011832 | 1/2007 |
| WO | 2007/011973 | 1/2007 |
| WO | 2007/145924 | 12/2007 |
| WO | 2007/146081 | 12/2007 |
| WO | 2008/010862 | 1/2008 |
| WO | 2008/010865 | 1/2008 |
| WO | 2009/017953 | 2/2009 |
| WO | 2009/137264 | 11/2009 |

OTHER PUBLICATIONS

Perry, et al., "Adsorption and Ion Exchange" in Perry's Chemical Engineer's Handbook, 7th ed., R. H. Perry and D. W. Green, ed., McGraw-Hill (1997), available on-line at www.knovel.com.*

J. Brennan, "Wide-Temperature Range Synthetic Hydrocarbon Fluids", Ind. Eng. Chem. Prod. Res. Dev., 1980, vol. 19, pp. 2-6.

K. Denbigh, "The Kinetics of Continuous Reaction Processes: Application to Polymerization", J. Applied Chem, 1951, vol. 1, pp. 227-236.

K. Denbigh, "Continuous Reactions: Part II. The Kinetics of Steady State Polymerisation", Trans Faraday Soc., 1947, vol. 43, pp. 648-660.

A. Munoz-Escalona et al., "Single-Site Supported Catalysts for Ethylene Polymerization", Metallocene Tech., 1999, pp. 2242-2246.

Z. Fan et al., "Effect of Ethoxy- and Methoxysilane Donors in Propene/1-Hexene Copolymerization With High-Yield Supported Ziegler-Natta Catalysts", Macromolecular Chemistry and Physics, 1994, vol. 195, pp. 3889-3899.

G. Gokel ed, Dean's Handbook of Organic Chemistry, 2nd Edition, McGraw-Hill, 2004, available online at hhttp://knovel.com.

O. Levenspiel, "Ch. 7 Design for Multiple Reactions", Chemical Reaction Engineering, 2nd ed., 1972, pp. 196-209.

N. Naga et al., "Effect of Co-Catalyst System on α-Olefin Polymerization With Rac- and Meso- [Dimethylsilylenebis(2,3,5-Trimethyl-Cyclopentadienyl)]Zirconium Dichloride", Macromol. Rapid Commun., 1997, vol. 18, pp. 581-589.

N. Naga et al, "Polymerization Behavior of α-Olefins With Rac- and Meso-Type Ansa-Metallocene Catalysts: Effects of Cocatalyst and Metallocene Ligand", Macromolecular Chemistry Physics, 1999, vol. 200, pp. 1587-1594.

F. Rodriguez, "The Molecular Weight of Polymers", Principles of Polymer Systems, 1970, Chapter 6, pp. 115-144.

M. Sacchi et al., "Use of Different Alkoxysilanes As External Donors in MgCl$_2$-Supported Ziegler-Natta Catalysts to Obtain Propene/1-Butene Copolymers With Different Microstructure", Macromolecular Chemistry and Physics, 1994, vol. 195, pp. 2805-2816.

T. Seraidaris et al., "High-Molar-Mass Polypropene with Tunable Elastic Properties by Hafnocene/Borate Catalysts", Journal of Polymer Science: Part A: Polymer Chemistry, 2006, vol. 44, pp. 4743-4751.

J. Wills, "Synthetic Lubricants", Lubrication Fundamentals, Marcel Dekker Inc., New York, 1980, pp. 75-80.

"Mobil Releases SuperSyn PAOs", Lubrication Engineers, 1999, vol. 55, Part 8, pp. 45.

TIBA data, "TIBA datasheet" available on-line at www.albermarle.com on Aug. 26, 2010.

* cited by examiner

PROCESS TO PRODUCE POLYOLEFINS USING METALLOCENE CATALYSTS

CROSS REFERENCE TO RELATED APPLICATION

This application claims the benefit of Provisional Application No. 60/831,995 filed Jul. 19, 2006, the disclosure of which is incorporated by reference in its entireties.

FIELD OF THE INVENTION

The invention relates to an improved process to produce polyolefin products with metallocene catalysts.

BACKGROUND OF THE INVENTION

Many activated homogeneous polymerization or oligomerization catalysts are very effective to produce liquid polyolefins for many applications, such as lubricant base stocks, functional fluids, adhesives, as well as intermediates used for further functionalization, etc. For all these applications, the catalyst components must be removed to below certain specification level (usually less than 10 ppm) before its next step or for applications. Catalyst removal is typically accomplished by first deactivating the catalyst followed by multi-stage washing with water followed by one or more separation steps to remove all the catalyst components. The washing step usually includes several stages of mixing with aqueous dilute acid/base wash and further settling/separation steps. See U.S. Pat. Nos. 6,960,700; 6,706,828, 7,060,768 and 5,705,577. There are also numerous aqueous work up procedures reported in the literature.

These prior art methods suffer particularly by being cumbersome and more importantly are difficult and expensive to scale up for commercial operation. They also generate a large amount of waste. Still more importantly, they are often not effective to reduce the metal content when the product is liquid polyolefins. Generally, when producing solid polyolefins by metallocene or other polymerization catalyst technology the catalyst residual is not an issue and is usually left in the product. However, in liquid polyolefins production, the catalyst residual generally must be removed, especially when the next step in the process is hydrogenation, functionalization, or for typical end use applications of liquid polyolefins, such as for lubrication formulations, personal care products or functional fluids. The presence of catalyst residual deactivates the hydrogenation catalyst, inhibits the functionalization reaction, and introduces impurities in the finished product which maybe detrimental for performance of the finished product.

The present inventors have discovered an efficient and effective method to remove polymerization catalyst residual by using a solid sorbent, which can interact chemically and/or physically with the catalyst components and/or the deactivated catalyst component. The method according to the present invention is particularly effective when scaled up to commercial operations.

SUMMARY OF THE INVENTION

The invention is directed to a process for producing polyolefins by one or more metallocene catalyst wherein residual catalyst is removed by using a solid sorbent.

In a preferred embodiment the polyolefin produced is poly-alpha-olefin (PAO).

In another preferred embodiment the polyolefin is a liquid polyolefin, more preferably a liquid PAO.

In yet another preferred embodiment at least one of the metallocene catalyst used in the process of the invention is selected from metallocene catalysts activated by methylaluminoxane (MAO) or a non-coordinating anion (NCA), optionally together with other promoters such as alkylaluminum, alkylboron or alkylzinc compounds. In yet anther preferred embodiment, the catalyst system can be any single site catalyst or other constraint geometry catalyst or any other homogeneous catalysts that can be absorbed by proper solid sorbant.

In still another preferred embodiment, the metallocene catalyst components are removed from the product stream by adding a solid sorbent which can later be removed by filtration or by passing said product stream through columns or filters containing the solid sorbent.

In yet still another preferred embodiment, linear alpha-olefins (LAO) are first polymerized by metallocene catalysts activated by methylaluminoxane (MAO) or a non-coordinating anion (NCA) together or optionally with other promoters such as alkylaluminum, alkylboron or alkylzinc compounds, followed, after the desired degree of polymerization, optional deactivation of the catalyst components, then removal of the catalyst residual by addition of solid sorbent or by passing the product stream through columns or filters containing the solid sorbent.

It is an object of the invention to provide a polyolefin product having a low metal content, suitable for any intermediate or end use.

It is further an object of the invention to produce metallocene polyalpha-olefins (mPAO) and more particularly high viscosity index polyalpha-olefins (mHVI-PAO) with superior properties from linear alpha-olefins such as 1-octene, 1-decene, and/or from mixed feeds, such as mixed LAOs, ethylene-propylene, ethylene-butene, ethylene-propylene-butene, ethylene-propylene-alpha-olefin, ethylene-LAO, and other mixed feeds of two or more components.

These and other objects, features, and advantages will become apparent as reference is made to the following detailed description, preferred embodiments, examples, and appended claims.

DETAILED DESCRIPTION

According to the invention, polyolefins are produced using activated homogeneous or colloidal catalyst system and the residual catalyst components in the polymerization effluent are removed by solid sorbent. When the polymerization is completed, this solid sorbent can be added into the polymerization effluent in the polymerization reactor or in a separate catalyst separation reactor. The solid sorbent can then be removed from the polymerization effluent by filtration or decantation method or any other appropriate solid removal method. Alternatively, the polymerization effluent containing the catalyst residual can pass through a solid sorbent bed in a column or in a filter to remove the catalyst residual. In preferred embodiments, the solid sorbent can act as a catalyst deactivator. Or optionally, the active catalyst component can be deactivated in the catalyst separation reactor by adding quench reagent, such as small amount of $CO_2$ gas, water or alcohol or other deactivator, followed by addition of solid sorbent or passed through a solid sorbent column as described above. In all cases, the sorbent-treated effluent has low metal contents and will be suitable for further operation, including distillation, fractionation or reaction such as hydrogenation or functionalization or use directly as synthetic base stocks or functional fluids.

The words sorbent or sorbent material as used herein means a material that sorbs other substances; i.e. the material has the capacity or tendency to take up other material by either absorption or adsorption.

This improved process eliminates the need to wash the reactor effluent with aqueous wash, to settle and to separate the organic and aqueous layers. Thus, the improved process has reduced waste stream, reduced equipment requirements and simpler process operation. It is easier to construct and to operate. The improved process produces effluent with lower amount of metal contents than conventional washing method. Lower amount of metal content in the effluent is beneficial for all the further uses of the polyolefin products formed by contact of the olefin monomer with the homogeneous or colloidal polymerization catalysts, whether that be distillation, fractionation, hydrogenation, functionalization or other chemical reaction, formulation into a formulated lubricant, use as a functional fluid, or the like.

The monomer which is contacted with the homogeneous or colloidal polymerization catalysts may be selected from any olefin which may be reacted with the catalyst to produce a product comprising polymer or oligomer of the olefin monomer and residual catalyst but preferably the monomer is one or more linear alpha olefins (LAO). The greatest advantage of the present invention is realized when the product is at least partially liquid. Accordingly, low molecular weight products are preferred. In a preferred embodiment, a feedstream comprising one or a mixture of LAOs selected from C3 to C30 LAOs is contacted with a homogenous or colloidal polymerization catalysts, such as an activated metallocene catalyst or an activated nickel or palladium diimide catalysts, or any other single site polymerization catalysts under oligomerization conditions to provide a liquid product suitable for use in lubricant components or as functional fluids. The range of feed olefins can also include mixtures of, for instance, ethylene and alpha-olefins, pure non-ethylene alpha-olefins, mixtures of alpha-olefins, alpha-olefins in the presence of other olefins, such as 1-butene in mixed C4 streams containing 2- and iso-butenes and n- and iso-butanes. Other possible alpha-olefin sources include whole range of LAO from ethylene growth process, full range LAO derived from wax cracking process, LAO produced from synthesis gas process, or purified LAO from coking process or other thermal cracking process.

The feed may also comprise an inert (with respect to the oligomerization reaction in question) material, such as a carrier, a solvent, or other olefin components present that is not an LAO. Examples are propane, n-butane, iso-butane, cis- or trans-2-butenes, iso-butenes, and the like, that maybe present with propylene or with 1-butene feed. Other examples are the impurity internal olefins or vinylidene olefins that are present in the LAO feed. Solvents for polymerization process can be any common paraffinic or aromatic hydrocarbons, such as pentanes, hexanes, heptane, benzene, toluene, xylenes, ethylbenzene, propylbenzene, i- or t-butylbenzene, etc. Other solvents that are compatible with the homogenous or colloidal catalyst systems can also be used. Examples are methylene chloride, chloroform, chlorobenzen, etc.

Ethylene can be used as one of the olefin feed. It is preferred that the amount of ethylene in said feed be at least less than 50 wt %. Example such feeds containing ethylene are ethylene and propylene, ethylene and 1-butene, ethylene and mixed butene stream containing 1-butene, ethylene and 1-pentene, ethylene and propylene and 1-butene or mixed butene stream containing 1-butene, ethylene and 1-hexene, ethylene and 1-heptene, and ethylene and mixture of C3 to C20 alpha-olefins. In preferred embodiment, the amount of ethylene should be less than 50 wt %. The product from these feeds are liquid polymer fluids.

In other embodiments, feeds may be advantageously selected from C3 to C30 LAOs, C3 to C24 LAOs, C5 to C24, C4 to C16 LAOs, C5 to C18, C5 to C16, C6 to C20 LAOs, C4 to C14 LAOs, C5 to C16, C5 to C16, C6 to C16 LAOs, C6 to C18 LAOs, C6 to C14 LAOs, among other possible LAO feed sources, such as any lower limit listed herein to any upper limit listed herein. In other embodiments, the feed will comprise at least one monomer selected from propylene, 1-butene, 1-pentene, 1-hexene to 1-octene and at least one monomer selected from C12-C18 alpha-olefins. A preferred embodiment is a feed comprising 1-hexene or 1-octene and 1-dodecene, 1-tetradecene, and mixtures thereof. Another preferred embodiment is a feed comprising 1-butene and 1-dodecene, 1-tetradecene, and mixtures thereof. Another preferred embodiment is a feed comprising 1-hexene or 1-octene and 1-decene, 1-dodecene, 1-tetradecene, and mixtures thereof. Another preferred embodiment is a feed comprising 1-butene and 1-octene, 1-decene, 1-dodecene, 1-tetradecene, and mixtures thereof. Another preferred embodiment is a feed comprising 1-butene and 1-hexene, 1-octene, 1-decene, 1-dodecene, 1-tetradecene, and mixtures thereof. Another preferred embodiment is a feed comprising 1-butene and 1-hexene and 1-dodecene, 1-tetradecene, and mixtures thereof. 1-butene can be pure component or in embodiments 1-butene is present in a C4 stream containing other butenes and/or butane, such as C4 raffinate 1 or raffinate 2 stream from refinery.

A particularly advantaged feedstock from the standpoint of supply and availability is 1-hexene. There are many source of 1-hexene. They are available from conventional LAO process. More recently, 1-hexene can be produced on-purpose in high yield and cheaply from ethylene. Therefore, there is advantage in using 1-hexene as one of the feeds. 1-hexene can also be isolated from Fischer-Tropsh process as is the case and available now commercially. The presence of 1-hexene in the LAO feed in the amount of anything from 0 to 95% is suitable. In preferred embodiment, 1-hexene is present in the feed in the amount of about 1 wt % or 10 wt % to about 85 wt % or less, 80 wt % or less, 75 wt % or less, 67 wt % or less, 60 wt % or less, 50 wt % or less, 40 wt % or less, 33 wt % or less, 30 wt % or less, 20 wt % or less, or 15 wt % or less as preferred embodiments. The same is also true for 1-octene. Other alpha-olefins such as propylene or 1-butene or a combination thereof are also very advantageous because propylene and 1-butene are readily available from refinery or from petrochemical plants. The source of propylene can be in pure form (as in chemical grade propylene or as in polymer grade propylene) or in PP stream (propane-propylene stream) or other appropriate form. The source of 1-butene can be in pure form (as in chemical grade 1-butene or as in polymer grade 1-butene) or in "BB stream" (butane-butene stream, such as Raff-1 or Raff-2 stream, as discussed, for instance, in U.S. Pat. No. 5,859,159), or other appropriate form. 1-pentene can also be used as one of the advantage feed in the mixed feed. This 1-pentene can be isolated from naphtha steam cracking unit, from other refinery source, or from Fischer-Tropsch synthesis process. Similar to 1-hexene, in embodiments the amount of propylene, 1-butene or 1-pentene can vary from 1 to 95% in the mixed feed, depending on the need of the product properties.

The source of the LAO is advantageously from ethylene growth processes, as described in U.S. Pat. Nos. 2,889,385;

4,935,569 (and numerous references cited therein); U.S. Pat. No. 6,444,867; and in Chapter 3 of Lappin and Sauer, Alpha-olefins Applications Handbook, Marcel Dekker, Inc., NY 1989. The LAO made from this ethylene growth process contains only even number olefins. LAO containing both even and odd number of carbons can also be made from steam-thermal cracking of wax, such as petroleum wax or Fischer-Tropsch wax or any other readily available hydrocarbon wax. LAO can also be made in the Fischer-Tropsch synthesis process, as described in U.S. Pat. No. 5,185,378 or U.S. Pat. No. 6,673,845 and references therein. LAO made directly from syn gas synthesis processes, which can produce significant amount of C3-C15 alpha-olefins, contains both even and odd number carbons.

In an embodiment, it is advantageous to use a high quality feed with minimum of inert material. However, the LAO containing other inert components, including saturated hydrocarbons, internal or vinylidene olefins or aromatic diluents can also be used as feed. In this case, the LAO would be reacted to give polymer and inert components will be passed through the reactor unaffected.

Another advantaged feedstock comprises 1-butene. In certain embodiments, a mixed feed comprising from 1 wt % to about 80 wt %, preferably 5 wt % to about 75 wt %, more preferably about 25 wt % to about 75 wt % is advantageous. It is particularly advantageous when the feed also comprises at least 20 wt % or 25 wt % to about 80 wt % or 75 wt % of at least one alpha-olefin selected from C6 to C24, preferably C8 to C18 alpha-olefins, preferably C10 to C18 alpha-olefins, preferably C12 to C18 alpha-olefins.

A feed pre-treatment may be conducted, such as by passing the liquid or gaseous feed stream through a column or over at least one bed comprising activated molecular sieves, such as 13X, 5A, 4A, 3A molecular sieve. Sometimes, two beds or columns or a combination thereof comprising the same or different molecular sieves are used. Prior art feed pre-treatments have been discussed in the Background section and any pretreatment described therein may be practiced with the present invention.

The improved process disclosed in this invention can be applied to any metallocene or single site polymerization process or other homogeneous catalytic process producing polyolefins wherein residual catalyst may be found in the product, but it is especially beneficial when the product comprises liquid polyolefin. The metallocene catalysts can be, for instance, any Zr, Hf, Ti, V, Cr, or other common half-metallocene catalysts. One of ordinary skill in the art will appreciate that when the metallocene catalyst contacts the olefin monomer to produce the polymer, an activator, co-activator, and the like may be optionally or preferably present. Typically the activators can be any form of the aluminoxane (especially methylaluminoxane MAO) or non-coordinating anion (NCA), with or without alkylaluminum, alkylboron or alkylzinc compound promoters, such as triisobutylaluminum (TIBA), tri-n-octylaluminum, triethylboron, etc., used alone or in a mixture.

Numerous metallocene catalysts and activator, co-activators, and the like, are known. These may include metallocene catalysts and/or activators, co-activators, and the like, discussed in U.S. Pat. Nos. 6,548,724 and 6,706,828.

In a preferred embodiment, the process of the invention employs as the "metallocene catalyst", a catalyst system comprising a metallocene compound (Formula 1, below) together with an activator such as a non-coordinating anion (NCA) (Formula 2, below) or methylaluminoxane (MAO) (Formula 3, below).

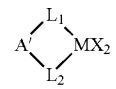

Formula 1

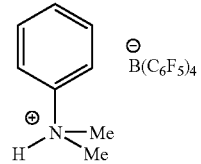

Formula 2

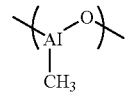

Formula 3

The term "catalyst system" is defined herein to mean a catalyst precursor/activator pair, such as a metallocene/activator pair. When "catalyst system" is used to describe such a pair before activation, it means the unactivated catalyst (precatalyst) together with an activator and, optionally, a co-activator (such as a trialkyl aluminum or trialkyl boron compounds). When it is used to describe such a pair after activation, it means the activated catalyst and the activator or other charge-balancing moiety. Furthermore, this activated "catalyst system" may optionally comprise the co-activator and/or other charge-balancing moiety.

In preferred embodiment the metallocene is selected from one or more compounds according to Formula 1, above. In Formula 1, M is selected from Group 4 transition metals, preferably zirconium (Zr), hafnium (Hf) and titanium (Ti), chromium (Cr), vanadium (V), L1 and L2 are independently selected from cyclopentadienyl ("Cp"), indenyl, and fluorenyl, which may be substituted or unsubstituted, and which may be partially hydrogenated, A is an optional bridging group which if present, in preferred embodiments is selected from dialkylsilyl, dialkylmethyl, ethylenyl (—CH2-CH2-), alkylethylenyl (—CR2-CR2-), where alkyl can be independently C1 to C16 alkyl radical or phenyl, tolyl, xylyl radical and the like, and wherein each of the two X groups, $X^a$ and $X^b$, are independently selected from halides, OR (R is an alkyl group, preferably selected from C1 to C5 straight or branched chain alkyl groups), hydrogen, C1 to C16 alkyl or aryl groups, haloalkyl, and the like. Usually relatively more highly substituted metallocenes give higher catalyst productivity and wider product viscosity ranges and are thus often more preferred.

The metallocene compounds, when activated by a per se commonly known activator such as methyl alumoxane, form active catalysts for the polymerization or oligomerization of olefins. Activators that may be used include alumoxanes such as methyl alumoxane (or MAO, shown in Formula II, above), modified methyl alumoxane, ethyl alumoxane, iso-butyl alumoxane and the like, Lewis acid activators including triphenyl boron, tris-perfluorophenyl boron, tris-perfluorophenyl aluminum and the like, ionic activators including dimethylanilinium tetrakis perfluorophenyl borate, triphenyl carbonium tetrakis perfluorophenyl borate, dimethylanilinium tetrakis perfluorophenyl aluminate, and the like, and non-coordinating anions such as shown in Formula III.

A co-activator is a compound capable of alkylating the transition metal complex, such that when used in combination with an activator, an active catalyst is formed. Co-activators include alumoxanes such as methyl alumoxane, modified alumoxanes such as modified methyl alumoxane, and aluminum alkyls such trimethyl aluminum, tri-isobutyl aluminum, triethyl aluminum, and tri-isopropyl aluminum, tri-n-hexyl aluminum, tri-n-octyl aluminum, tri-n-decyl aluminum or tri-n-dodecyl aluminum or trialkylboron compounds. Co-activators, one components or mixture of co-activators, are typically used in combination with Lewis acid activators and ionic activators when the pre-catalyst is not a dihydrocarbyl or dihydride complex. Sometimes co-activators are also used as scavengers to deactivate impurities in feed or reactors.

The alumoxane component useful as an activator typically is preferably an oligomeric aluminum compound represented by the general formula $(R^x—Al—O)_n$, which is a cyclic compound, or $R^x(R^x—Al—O)_nAlR^x_2$, which is a linear compound. Most common aluminoxane is a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and "n" is an integer from 1-50. Most preferably, $R^x$ is methyl and "n" is at least 4. Methyl alumoxane and modified methyl alumoxanes are most preferred. For further descriptions see, EP 0 279 586, EP 0 594 218, EP 0 561 476, WO94/10180 and U.S. Pat. Nos. 4,665,208, 4,874,734, 4,908,463, 4,924,018, 4,952,540, 4,968,827, 5,041,584, 5,091,352, 5,103,031, 5,157,137, 5,204,419, 5,206,199, 5,235,081, 5,248,801, 5,329,032, 5,391,793, and 5,416,229.

When an alumoxane or modified alumoxane is used, the catalyst-precursor-to-activator molar ratio (based on the metals, e.g, Zr or Hf to Al) is from about 1:3000 to 10:1; alternatively, 1:2000 to 10:1; alternatively 1:1000 to 10:1; alternatively, 1:500 to 1:1; alternatively 1:300 to 1:1; alternatively 1:250 to 1:1, alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-catalyst-precursor ratio is 1:1 molar ratio.

Ionic activators (which in embodiments may be used in combination with a co-activator) may be used in the practice of this invention. They are exemplified by Formula 2, above, which a preferred ionic activator. Preferably, discrete ionic activators such as $[Me_2PhNH][B(C_6F_5)_4]$, $[R3NH][B(C_6F_5)_4]$, $[R4N][B(C_6F_5)_4]$, $[Ph_3C][B(C_6F_5)_4]$, $[Me_2PhNH][B((C_6H_3-3,5-(CF_3)_2))_4]$, $[Ph_3C][B((C_6H_3-3,5-(CF_3)_2))_4]$, $[NH_4][B(C_6H_5)_4]$ or Lewis acidic activators such as $B(C_6F_5)_3$ or $B(C_6H_5)_3$ can be used, where Ph is phenyl and Me is methyl, R=C1 to C16 alkyl groups. Preferred co-activators, when used, are alumoxanes such as methyl alumoxane, modified alumoxanes such as modified methyl alumoxane, and aluminum alkyls such as tri-isobutyl aluminum, and trimethyl aluminum, triethyl aluminum, and tri-isopropyl aluminum, tri-n-hexyl aluminum, tri-n-octyl aluminum, tri-n-decyl aluminum or tri-n-dodecyl aluminum. The preferred ionic activators are N,N-dimethylanilinium tetrs(pentafluorophenyl)borate, tetra-methylanilinium tetrs(pentafluorophenyl)borate, tetradecylanilinium tetrs(pentafluorophenyl)borate, tetrahexadecylanilinium tetrs(pentafluorophenyl)borate, $[Ph_3C][B(C_6F_5)_4]$, $B(C_6F_5)_3$.

It is within the scope of this invention to use an ionizing or stoichiometric activator, neutral or ionic, such as tri (n-butyl) ammonium tetrakis (pentafluorophenyl) borate, a trisperfluorophenyl boron metalloid precursor or a trisperfluoronaphthyl boron metalloid precursor, polyhalogenated heteroborane anions (e.g., WO 98/43983), boric acid (e.g., U.S. Pat. No. 5,942,459) or combination thereof.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

Ionic catalysts can be prepared by reacting a transition metal compound with an activator, such as $B(C_6F_6)_3$, which upon reaction with the hydrolyzable ligand (X') of the transition metal compound forms an anion, such as $([B(C_6F_5)_3(X')]^-)$, which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

The catalyst precursors can also be activated with cocatalysts or activators that comprise non-coordinating anions containing metalloid-free cyclopentadienide ions. These are described in U.S. Patent Publication 2002/0058765 A1, published on 16 May 2002, and typically require the addition of a co-activator to the catalyst pre-cursor.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Preferred non-coordinating anions useful in accordance with this invention are those that are compatible, stabilize the transition metal complex cation in the sense of balancing its ionic charge at +1, yet retain sufficient lability to permit displacement by an ethylenically or acetylenically unsaturated monomer during polymerization. These types of cocatalysts are sometimes used with scavengers. They have the general compositions of (R1, R2, R3)-Al where R1, R2 and R3 can be independently selected from H or any of C1 to C20 hydrocarbyl radicals. Examples of the trialkylaluminum compounds include but are not limited to tri-iso-butyl aluminum, tri-n-octyl aluminum, tri-n-hexyl aluminum, triethylaluminum or trimethylaluminum Invention processes also can employ cocatalyst compounds or activator compounds that are initially neutral Lewis acids but form a cationic metal complex and a noncoordinating anion, or a zwitterionic complex upon reaction with the alkylated transition metal compounds. The alkylated metallocene compound is formed from the reaction of the catalyst pre-cursor and the co-activator. For example, tris (pentafluorophenyl) boron or aluminum act to abstract a hydrocarbyl ligand to yield an invention cationic transition metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.,* 100, 1391-1434 (2000).

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric NCA type activator is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:500 to 1:1, 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include methylalumoxane, modified methylalumoxane, mixtures of methylalumoxane with dimethylanilinium tetrakis(pentafluorophenyl)borate or tris(pentafluorophenyl) boron, and mixtures of trimethyl aluminum with dimethylanilinium tetrakis(pentafluorophenyl)borate or tris (pentafluorophenyl)boron.

In some embodiments, scavenging compounds are used with stoichiometric activators. Typical aluminum or boron alkyl components useful as scavengers are represented by the general formula $R^xJZ_2$ where J is aluminum or boron, $R^x$ is as previously defined above, and each Z is independently $R^x$ or a different univalent anionic ligand such as halogen (Cl, Br, I), alkoxide ($OR^x$) and the like. $R^x$ is a H or any radical chosen from the C1 to C20 hydrocarbyl radicals. Most preferred aluminum alkyls include triethylaluminum, diethylaluminum chloride, tri-iso-butylaluminum, tri-n-octylaluminum. tri-n-hexylaluminum, trimethylaluminum and the like. Preferred boron alkyls include triethylboron. Scavenging compounds may also be alumoxanes and modified alumoxanes including methylalumoxane and modified methylalumoxane.

The catalyst described in U.S. Pat. No. 7,060,768 and references therein can be used to polymerize at least one or mixture of the olefins selected from ethylene, C3 to C30 alpha-olefins to give liquid polyalpha-olefins. The catalyst components in the polymerization effluent produced from these catalysts can also be removed by this inventive method.

The polymerization process according to the invention will typically be accomplished in a homogeneous or colloidal solution processes. Generally this involves polymerization or oligomerization in a continuous reactor in which the polymer formed and the starting feed according to the invention and catalyst materials according to the invention are agitated to reduce or avoid concentration or temperature gradients. Temperature control in the reactor is generally obtained by balancing the heat of polymerization and with reactor cooling by reactor jackets or cooling coils or a cooled side-stream of reactant to cool the contents of the reactor, auto refrigeration, pre-chilled feeds, vaporization of liquid medium (diluent, monomers or solvent) or combinations of all the above methods. Adiabatic reactors with pre-chilled feeds may also be used. The reactor temperature depends on the catalyst used and the product desired. Higher temperatures tend to give lower molecular weights and lower temperatures tend to give higher molecular weights, however this is not a hard and fast rule. In general, the reactor temperature preferably can vary between about 0° C. and about 300° C., more preferably from about 10° C. to about 250° C., and most preferably from about 25° C. to about 230° C. Usually, it is important to control the reaction temperature as pre-determined. In order to produce fluids with narrow molecular distribution, such as to promote the highest possible shear stability, it is useful to control the reaction temperature to obtain minimum of temperature fluctuation in the reactor or over the course of the reaction time. If multiple reactors are used in series or in parallel, it is useful to keep the temperature constant in a pre-determined value to minimize any broadening of molecular weight distribution. In order to produce fluids with broad molecular weight distribution, one can adjust the reaction temperature swing or fluctuation, or as in series operation, the second reactor temperature is preferably higher than the first reactor temperature. In parallel reactor operation, the temperatures of the two reactors are independent. Or one can use two types of metallocene catalysts.

While reaction conditions may generally be determined by one of ordinary skill in the art in possession of the present disclosure, typical conditions will now be discussed.

The pressure in any reactor used herein can vary typically from about 0.1 atmosphere to 100 atmosphere (1.5 psi to 1500 psi), preferably from 0.5 bar to 75 atm (8 psi-1125 psi), most preferably from 1.0 to 50 atm (15 psi to 750 psi). The reaction can be carried out under the atmosphere of nitrogen or with some hydrogen. Sometimes a small amount of hydrogen is added to the reactor to improve the catalyst productivity. The amount of hydrogen is preferred to keep at such a level to improve catalyst productivity, but not induce any hydrogenation of olefins, especially the feed alpha-olefins because the conversion of alpha-olefins into saturated paraffins is very detrimental to the efficiency of the process. The amount of hydrogen partial pressure is preferred to be kept low, less than 100 psi, prefer less than 50 psi, preferably less than 25 psi, preferably less than 10 psi, preferably less than 5 psi, preferably less than 1 psi. In a particularly preferred embodiment in any of the process described herein the concentration of hydrogen in the reactant phase is less than 100 ppm, preferably less than 50 ppm, preferably less than 10 ppm, preferably less than 1 ppm. In a particularly preferred embodiment in any of the process described herein the concentration of hydrogen in the reactor is kept at a partial pressure of 200 psi (1379 kPa) or less, based upon the total pressure of the reactor, preferably 150 psi (1034 kPa) or less, preferably 100 psi (690 kPa) or less, preferably 50 psi (345 kPa) or less, preferably 10 psi (69 kPa) or less.

The reaction time or reactor residence time is usually dependent on the type of catalyst used, the amount of catalyst system used, and the desired conversion level. Different metallocenes have different activity. Usually, higher degree of alkyl substitution on the cyclopentadienyl ring, or bridging improves catalyst productivity. Catalysts such as 1,2,3,4-tetramethylcyclopentadienylzirconium dichloride or 1,2,4-trimethylcyclopentadienylzirconium dichloride, or pentamethylcyclopentadienyl zirconium dichloride or their dialkyl analogs have desirable high productivity and stability than unsubstituted metallocenes. Certain bridged and bridged with substitution catalysts, such as the di-halides or dialkyls of dimethylsilylbis[indenyl]zirconium or dimethylsilylbis[tetrahydroindenyl]zirconium dimethylsilylbis[1-methylindenyl]zirconium or their hafnium analogs, etc. Usually the amount of catalyst components used is determinative. High amount of catalyst loading tends to gives high conversion at short reaction time. However, high amount of catalyst usage make the production process uneconomical and difficult to manage the reaction heat or to control the reaction temperature. Therefore, it is useful to choose a catalyst with maximum catalyst productivity to minimize the amount of metallocene and the amount of activators needed. When the catalyst system is metallocene plus methylalumoxane, the range of methylalumoxane used is typically in the range of 0.1 milligram (mg) to 500 mg/g of alpha-olefin feed. A more preferred range is from 0.05 mg to 10 mg/g of alpha-olefin feed. Furthermore, the molar ratios of the aluminum to metallocene (Al/M molar ration) range from 2 to 4000, preferably 10 to 2000, more preferably 50 to 1000, preferably 100 to 500. When the catalyst system is metallocene plus a Lewis Acid or an ionic promoter with NCA component, the metallocene use is typically in the range of 0.01 microgram to 500 micrograms of metallocene component/gram of alpha-olefin feed. Usually the preferred range is from 0.1 microgram to 100 microgram of metallocene component per gram of alpha-olefin feed. Furthermore, the molar ratio of the NCA activator to metallocene is in the range from 0.1 to 10, preferably 0.5 to 5, preferably 0.5 to 3. If a co-activator of alkylaluminum compound is used, the molar ratio of the Al to metallocene is in the range from 1 to 1000, preferably 2 to 500, preferably 4 to 400.

Typically it is preferred to have the highest possible conversion (close to 100%) of feed alpha-olefin in shortest possible reaction time. However, in CSTR operation, sometimes it is optimal to run the reaction at slightly less than 100% conversion. There are also occasions, when partial conversion is more desirable when the narrowest possible MWD of the product is desirable because partial conversion can avoid a MWD broadening effect. If the reaction is conducted to less than 100% conversion of the alpha-olefin, the unreacted starting material after separation from other product and solvents/diluents can be recycled to increase the total process efficiency.

Desirable residence times for any process described herein may likewise be determined by one of ordinary skill in the art in possession of the present disclosure, and will typically range from 1 minutes to 20 hours, or more typically 5 minutes to 10 hours.

Each of these processes may also be employed in single reactor, parallel or series reactor configurations. The liquid processes comprise contacting olefin monomers with the above described catalyst system, preferably in a suitable diluent, solvent, recycle, or mixture thereof, and allowing the reaction to occur for a sufficient time to produce the desired polymers or oligomers. Hydrocarbon solvents both aliphatic and aromatic are suitable. Aromatics such as benzene, toluene, xylenes, ethylbenzene, propylbenzene, cumene, t-butylbenzene are suitable. Alkanes, such as hexane, heptane, pentane, isopentane, and octane, are also suitable. Generally, toluene is most suitable to dissolve catalyst components. Paraffinic solvents, such as Norpar™ or Isopar™, available from ExxonMobil Chemical Company in Houston, Tex., or hexanes (or mixtures thereof) are preferred as reaction diluents. Oftentimes, a mixture of toluene and Norpar™ or Isopar™ paraffinic solvent is used as diluent or solvent.

In other embodiments, the process can be advantageously carried out in a continuous stirred tank reactor, batch reactor, or plug flow reactor, or more than one reactor operated in series or parallel. These reactors may have or may not have internal cooling and the monomer feed may or may not be refrigerated. See, for instance, U.S. Pat. No. 5,705,577 for typical process conditions.

As previously mentioned, the present invention is most beneficial when the product comprises liquid polyolefin product. The types of liquid polyolefins products include ethylene-alpha-olefin copolymer or terpolymer, homopolymers/copolymer/terpolymer of non-ethylene-alpha-olefins, linear alpha-olefin homopolymer, copolymer or terpolymer, etc. Specific examples for these polymers include polyalpha-olefins (PAO), poly-1-decene, copolymer or terpolymer or multi-component liquid polymer of C3 to C24, terpolymer of C8, C10, C12-LAO, copolymer of C6 and C12 or C6 and C14, copolymer of C4 and C12 or C4 and C14, ethylene-propylene copolymer, ethylene-butene copolymer, ethylene-pentene copolymer, ethylene-propylene-butene terpolymer, ethylene-propylene-hexene terpolymer, etc. In a preferred embodiment, the polymer can have a number averaged molecular weight ranging from 180 to 100,000.

For the purposes of this invention, a "liquid" is defined to be a fluid that has no distinct melting point above 25° C., and has a kinematic viscosity at 100° C. of 5000 cSt or less, preferably 3000 cSt or less and/or a kinematic viscosity at 40° C. of 200,000 cSt or less, preferably 100,000 cSt or less.

The product of the contacting will comprise the polyolefin and residual catalyst. The term "residual catalyst" as used herein will include unreacted catalyst precursor, if any, unreacted activated catalyst, various forms of the catalyst which may be formed during the reaction and/or during or after deactivation (such as with water or alcohol).

The polymerization process and effluent can contain one or more other solvents, such as benzene, toluene, xylenes, ethylbenzene, cumene, n-propylbenzene, other one-ring aromatics or paraffin solvents such as Norpar™ or Isopar™.

Sorbent is used, at least in part, to separate the residual catalyst from the desired polyolefin. The sorbent used in this catalyst separation step can be any solid sorbent with active surface area and pore volume capable of absorbing the catalyst components. Typical examples are natural or synthetic clay, modified clay, diatomaceous earth, activated charcoal, silica gel, alumina, aluminosilicate, zeolites, molecular sieves, cellulose material, metal oxides or metal salts, such as calcium oxides, magnesium oxides, titanium oxides, zirconium oxides, aluminum oxides, activated or treated in appropriate manners. These solid materials have chemical and physical active sites to interact with the catalyst components.

The solid sorbents generally have surface hydroxyl group or surface oxygen group to react chemically or to interact physically with the catalyst components and/or catalyst residuals. Generally they should have surface area greater than $0.1$ m$^2$/gram and with a pore volume greater than 0.01 cc/gram. The sorbent used in slurry phase have fine particle size, from 1 micron to 1000 micron average particle size or in extrudate form. The sorbent used in a cartridge filter can have particle size from 1 micron to 1 mesh size. The sorbent used in fixed bed catalyst removal process can have larger particle size, from 600 mesh size to 1 mesh size, or in extrudate form of different size and shape to maximize contact between liquid and solid. The sorbent can have small amount of water or moisture or air in it to act as catalyst poison to deactivate the polymerization reaction, so that no extra catalyst deactivator is needed. Many sorbent material have surface hydroxyl group or surface oxygen group, which can react chemically with the active polymerization catalyst components. Therefore, they can be used as catalyst deactivator. Furthermore, these chemical reaction with catalysts provide strong sorption of the catalyst components by the sorbent, thus facilitating the high degree of catalyst removal.

The amount of sorbent used to effectively remove all the catalyst residual ranged from 0.01 wt % to 500 wt % of the reactor effluent. The contact time before separating the sorbent from reaction effluent ranged from 0.01 minute to 20 hours, more preferred to be in between 0.1 minutes to 10 hours, depending on whether it is in slurry or in fixed bed or in filter cartridge. The contact temperature is preferred to be between 0° C. to 150° C. The convenient contact temperature is usually from room temperature to 100° C., depending on product viscosity, catalyst concentration, sorbent type, etc. More viscous effluent usually needs higher contact temperature to ensure proper pumping, agitation and contact. However, the temperature should not be so high as to interfere with catalyst sorption by the sorbent. The contact pressure can be atmosphere pressure to 2,000 psi, depending on types of operation. For slurry contact, the atmospheric pressure or up to 100 psi is adequate. For every viscous fluid and fixed bed or cartridge filter type of catalyst removal, higher pressure up to 2000 psi is needed to ensure proper flow of the effluent during pumping. For fixed bed operation, the feed rate ranged from 0.01 to 3000 g liquid per g of solid sorbent per hour. The sorbent used in slurry reactor or in fixed bed reactor can be regenerated by typical sorbent regeneration method. The regenerated sorbent can be re-used to remove more catalyst residual. The solid sorbent can also be deposited in a commercial filter, such as Sparkler filter and the polymerization reactor effluent will be passed through this filter to remove any catalyst component with recirculation to remove the catalyst component. The rate of filtration is usually determined by the throughput of production facility. The sorbent can also be added directly to the polymerization effluent and stirred for enough time and then the sorbent together with the absorbed catalyst components can be removed by decantation or filtration.

Particularly preferred sorbents useful in the process of the invention include silica, alumina, activated alumina, di-atomaceous earth filter aid, zeolites of different pore size, MCM41, natural or synthetic clay materials, micro crystalline material or powdered cellulose material with hydroxyl group. These material are available from commercial solid sorbent suppliers with different trade names. Examples suitable for this applications include CELITE 545 (flux calcined diatomaceous earth), CELITE 577 (calcined diatomaceous earth), HYFLOW (flux calcined diatomaceous earth), PERLITE (a sodium potassium aluminum silicate), Hyflo-Super-Cel™ (flux calcined diatomaceous earth), etc. Powered cellulose may have many different trade names. Examples are Solka-Floc® and Alpha-Cel™ brand powdered cellulose. These solid sorbent material can be used by itself or mixed with other sorbents to make them more effective. For example, the cellulose sorbent can be coated to a cartridge filter before or after it is coated with CELITE or PERLITE material to improve its efficiency for the catalyst deactivation and filtration.

The solid sorbent can be added to the polymerization reactor and then removed by filtration, or they can be arranged in solid bed to which the polymerization effluent is passed through. These sorbent can be further re-activated and regenerated by calcinations or by washing/drying/calcinations. Thus the solid sorbent can be re-used. This method is much more efficient than conventional washing method, which generated a large amount of aqueous waste.

Separation of the solid sorbent with the residual catalyst absorbed thereon is easily accomplished. In the case where the effluent if passed through a column, no separation is generally required. Where the sorbent is mixed with the reaction product, after optionally settling the mixture may be passed through a filtering system such as a carbon filter or membrane filter or any commercial filter, which maybe packed with filter aide or other solid material which functions both as filter aide and catalyst sorbent. Or in the most efficient operation, the polymerization effluent containing the polymer, catalyst residual and other components can be passed through a commercial filter precoated with filter aide and sorbent or just sorbent which functions as both filter aide and sorbent. Examples of solids that can be used for the dual purpose include Celite, natural or synthetic clays or zeolites, celites, powered cellulose material, silica-alumina, alumina silicates, activated alumina, silica or charcoal.

This improved process is especially suitable for the production of synthetic lubricant base stocks or for production of starting material for further functionalization. In the production of synthetic base stock, alpha-olefins are first polymerization to give PAO or HVI-PAO fluid by metallocene catalyst. The catalyst components are then removed by sorbent. The finished base stock is isolated by distillation to remove light end and hydrogenation to remove any unsaturation if necessary. Similarly, this improved process can be applied to produce ethylene-butene copolymer from ethylene and 1-butene containing C4 streams as described in U.S. Pat. No. 5,705,577, or liquid terpolymer of ethylene-propylene-butene or ethylene-propylene-alpha-olefins as described in U.S. Pat. No. 6,388,148, or in liquid PAO from mixture of alpha-olefins or single olefins as described in U.S. Pat. No. 4,704,491, U.S. Pat. No. 7,022,784, WO2007011832, WO2007011459, WO2007011973.

This improved process is also especially suitable for production of raw material for further functionalization. In this case, olefins are first polymerized to give polyolefin fluids. The fluids are then treated with solid sorbent to remove catalyst components. The desired polyolefins may optionally then be isolated by distillation and/or distillation may be used to remove light ends if necessary. The olefins with high degree of unsaturation are ready for next step of reaction with maleic anhydride, with phenol, or with other reagents to convert them into useful products. Specific examples are for producing liquid polypropylene, poly-1-butene or poly-iso-butene products.

The following examples are meant to illustrate the present invention and provide a comparison with other methods and the products produced therefrom. Numerous modifications and variations are possible and it is to be understood that within the scope of the appended claims, the invention may be practiced otherwise than as specifically described herein.

The alpha-olefins used for all the experiments, either individually or pre-mixed, were purified by mixing 1 liter of un-treated raw material with 20 grams of activated 13X molecular sieve and 10 grams of de-oxygenate catalyst (a reduced copper catalyst) for at least two days inside a glove box. The molecular sieve and de-ox catalyst were then removed by filtration. This treated individual alpha-olefins were than combined to give the desirable composition. Similarly, this purification can be carried out by pumping a stream of the alpha-olefins, either alone or pre-mixed, through a bed of activated 13X molecular sieve alone, or through a bed of activated 13X molecular sieve followed by a bed of de-oxygenated catalyst, prior to entering reactor.

Polymerization method A: to a 3 liter reactor, purified 1-decene was charged at 5.5 gram/minute, metallocene catalyst solution of 0.48 mg/gram at 0.1 gram/minute, 10% MAO in toluene solution at 0.052 gram/minute and purified NORPAR solvent at 1 gram/minute. The total feed time was 4 hours and the reaction was held for another 4 hours. The reactor was maintained at 70° C.

Polymerization method B: to a 12 liter reactor, purified 1-decene was charge at 16.7 gram/minute, metallocene catalyst solution of 1.25 mg/gram at 0.166 gram/minute, promoter N,N-dimethylanilinium tetra(perfluorophenyl) borate of 2.4 mg/gram in toluene solution at 0.14 gram/minute, tri-n-octylaluminum or tri-isobutylaluminum solution of 0.122 gram/gram at 0.14 gram/minute. The total feed time was 4 hours and the reaction was held for another 4 hours. The reactor was maintained at 80° C.

Example 1

At the end of each polymerization, the metal contents of the polymerization effluent are shown in Table 1. The effluent was treated with 250 ppm water (or alcohol). Then, 1.5 wt % of a solid material Hyflo-SuperCel™ from Celite, which is a kind of diatomaceous earth solid, was added to the reactor effluent. The slurry was stirred at room temperature for 15 minutes. The slurry was filtered to remove solid sorbent. The effluent contained less than 1 ppm of metal catalyst components—Al, Zr, Si and B. The product is clear and white and ready for distillation and further reaction.

|  | Polymerization method | |
|---|---|---|
|  | A | B |
| Metal content in polymerization effluent, ppm | | |
| Al | 170-600 | 50 to 100 |
| Zr | 1 to 3 | 1-4 |
| B | — | 0.2-0.5 |
| Si | 0.3 to 1 ppm | 0.5-1.5 |

Example 2 (Comparative)

A polymerization effluent consisting of 75% polymer, 8% unreacted olefins, 15% NORPAR 12 solvent, 2% Toluene, and about 360 ppm aluminum from MAO was washed with an equal weight of water. The crude effluent mixed with water was heated to 80° C. and agitated for 60 minutes at an agitator speed of 350 ppm [ppm=parts per million] The agitation was stopped and the mixture allowed to phase separate for 60 minutes. The resulting oil layer was split and analyzed for Aluminum. The oil was found to contain about 98 ppm Aluminum.

Example 3 (Comparative)

Additional 3 wt % of Toluene was added to a polymerization effluent consisting of 75% polymer, 8% unreacted olefins, 15% NORPAR 12 solvent, 2% Toluene, and about 360 ppm aluminum from MAO. This mixture was washed with an equal weight of water. The crude effluent was mixed with water was heated to 80° C. and mixed for 60 minutes at an agitator speed of 350 ppm. The agitation was stopped and the mixture allowed to phase separate for 60 minutes. The resulting oil layer was split and analyzed for Aluminum. The oil was found to contain about 60 ppm Aluminum.

Example 4 (Comparative)

A polymerization effluent consisting of 75% polymer, 8% unreacted olefins, 15% NORPAR 12 solvent, 2% Toluene, and about 360 ppm aluminum from MAO was washed with an equal weight of water. The crude mixed with water was heated to 80° C. and mixed for 5 minutes at an agitator speed of 1600 ppm. The agitation was stopped and the mixture allowed to phase separate for 60 minutes. The resulting oil layer was split and analyzed for Aluminum. The oil was found to contain about 11 ppm Aluminum.

Example 5

A distilled polymerization effluent from polymerization method A consisting of about 98% polymer, less than 2% dimers of alpha-olefin feed and about 360 ppm aluminum from MAO was mixed with 1.5% of diatomaceous earth solid sorbent filter aid Hyflo-SuperCel™ from Celite. The slurry was stirred at room temperature for 15 minutes. The slurry was filtered to remove solid sorbent. The effluent contained about 4 ppm Aluminum. The product is bright and clear and colorless.

Example 6

A polymerization effluent from polymerization method B consisting of about 85% polymer, 13% unreacted olefins, 1% hexane, 1% Toluene, 10 ppm Zirconium and about 80 ppm aluminum from Triisobutyl aluminum was treated with 250 ppm water (or alcohol) and mixed with 1.5% of diatomaceous earth solid sorbent filter aid Hyflo-SuperCel™ from Celite. The slurry was stirred at room temperature for 15 minutes. The slurry was filtered to remove solid sorbent. The effluent contained less than 1 ppm each of Aluminum, Boron, Silicon and Zirconium. The product is bright and clear and colorless and ready for distillation and further reaction.

Example 7

A polyalpha-olefin effluent was produced by polymerizing an alpha-olefin mixture of 1-hexene, 1-decene and 1-tetradecene with a metallocene catalyst dimethylsilylbis(tetrahydroindenyl)zirconium dichloride activated by N,N-dimethylanilimuim tetrakis(perfluorophenyl)borate with co-activator tri-n-octylaluminum. The active catalyst component was deactivated by water at about 100 ppm. The effluent was then removed by passing through a commercial Sparker filter with impregnated paper media. The filtered product contained less than 1 ppm of Zr, Al, B, Si, indicative of effective catalyst removal. Alternatively, effluent, after the catalyst components were deactivated by water, was mixed with 0.2 wt % cellulose powder BH40 and the filtration was carried out using a filter aide pre-coated sparkler filter at 125° C. The filtrate had low particle count of less than ISO 17 and had metal content less than 1 ppm.

Example 8

Similar PAO effluent as in Example 7 was treated with 0.2 wt % powdered cellulose BH40 to deactivate the catalyst and absorb the catalyst residual. The mixture was then passing through a commercial filter pre-coated with a filter aid CELITE 545 at 05 lb/ft$^2$ at room temperature at ~5.5 gal/ft$^2$-hr. The effluent from the filtration contained less than 1 ppm of Zr, Al, B, Si.

Example 9

Similar to Example 8, except at the end of the polymerization, the effluent was passed through a flash distillation at 150° C. to remove un-reacted olefin light ends. The distillate was then treated the similar manner as Example 8.

Example 10

Similar to Example 8, except filtration was conducted at 50° C. and the filtration rate was 10 gal/ft$^2$-hr. The product from filtration contained less than 1 ppm of Zr, Al, B and Si.

Example 11

Similar to Example 8, except the filtration was conducted over a commercial filter pre-coated with 0.5 lb/ft2 of CELITE 577. The product contained less than 1 ppm of all metals.

Example 12

Similar to Example 8, except 0.2 wt % of a powdered PERLITE (an amorphous silicate), DECALITE BF (diatomaceous earth), was used to deactivate and absorb the catalyst components. The product after filtration contained less than 1 ppm of all metals.

These data show that the polymerization effluents from Examples 1, 5 and 6 according to this invention consistently have lower metal contents than the effluents in Comparative Examples 2-4.

In embodiments, the method of catalyst removal according to the present invention significantly simplifies the equipment needed for commercial operation, thus, reducing capital investments. When the residual fluid produced in this invention is further subjected to hydrofinishing by fixed bed or slurry hydrogenation process, the hydrogenation catalyst will have much higher reactivity, much longer catalyst life time and higher reactor throughput because the new catalyst removal method can reduce catalyst residual, including Ni, Pd, Ti, Hf, Cr, Zr, Cl, F, B, Si, Al, N, etc., to much lower level than available by prior art methods. The fluid produced in this process will have significantly lower level of impurity components, thus, will have significantly improved product property. When the residual fluid produced in this invention is further subjected to functionalization reaction, such as reaction with maleic anhydride, the functionalization reaction will proceed with greater efficiency because of lack of impurity to inhibit the reaction. Again, the functionalized product will have no extraneous catalyst residual, which maybe detrimental to the finished product. Similarly, when the residual fluid is further subjected to alkylation reaction with aromatic compounds, such as benzene, toluene, xylene, naphthalene, phenol or substituted phenol, etc., over alkylation catalysts, the alkylation reaction may proceed more efficiently than residual products containing higher amount of polymerization catalyst residuals.

Trade names used herein are indicated by a ™ symbol or ® symbol, indicating that the names may be protected by certain trademark rights, e.g., they may be registered trademarks in various jurisdictions.

Terms used herein, unless specifically defined otherwise, should take their ordinary and customary meaning in the art. When reference to extrinsic sources is necessary to help define a term or phrase, reference should first be made to the well-known text "Synthetic Lubricants and High-Performance Functional Fluids", 2nd edition, revised and expanded, edited by Rudnick and Shubkin, Marcel Dekker, Inc., NY and Basel, 1999. As a secondary source, reference can be made to the Handbook of Petroleum Refining Processes, 3rd edition, McGraw-Hill Handbooks, Robert A. Meyers, Editor in Chief, 2004. In addition, all patents and patent applications, test procedures (such as ASTM methods, UL methods, and the like), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Notwithstanding, the following are preferred embodiments: a method comprising: (a) contacting olefin monomer with at least one activated homogeneous or colloidal polymerization catalyst in a polymerization reactor to produce a product comprising at least one polyolefin and residual catalyst; (b) contacting said product comprising said polyolefin with a solid sorbent whereby said solid sorbent absorbs at least a portion of said residual catalyst to produce a solid sorbent with residual catalyst; (c) separating said solid sorbent with residual catalyst from said at least one polyolefin; and (d) recovering said at least one polyolefin; which in preferred embodiments includes modifications such as the following: wherein said contacting in step (b) occurs by adding said solid sorbent to the reactor used in step (a); wherein said contacting in step (b) occurs by contact of said solid sorbent and said product in a catalyst separation reactor separate from said polymerization reactor; wherein said contacting in step (b) occurs by passing an effluent comprising said product through a bed or column comprising said solid sorbent; and moreover where any of these embodiments may be modified by one or more of the following: wherein step (c) comprising filtration (particularly wherein steps (b) and (c) are accomplished in one combined operation where sorption of catalyst and filtration occur simultaneous); further including a step of catalyst deactivation (particularly wherein said catalyst deactivation comprises contacting said residual catalyst with at least one quench reagent selected from the group consisting of $CO_2$, water, alcohol, air, sorbent, and catalyst poison; wherein said deactivation occurs before a distillation step to remove at least one of: the un-reacted starting material, solvent, and/or the light ends from the polymerization reaction mixture; or wherein said deactivation occurs after a distillation step to remove at least one of: the un-reacted starting material, solvent, and/or the light ends from the polymerization reaction mixture); further comprising after step (d): (e) contacting said at least one or part of the polyolefin with at least one functionalizing species to produce a functionalized species (especially wherein said functionalizing species is selected from the group consisting of aromatic compounds, benzene, toluene, xylenes, naphthalene and alkylnaphthalene, methylnaphthalenes, maleic anhydride, organic amine, organic acid or alcohol); and where possible, the process further comprising after step (d): (e) fractionating the reaction mixture into plural fractions, with at least one fraction comprising at least one polyolefin; (f) then (i) hydrogenating at least a portion of said at least one polyolefin from step (e), and/or (ii) functionalizing at least a portion of said at least one polyolefin from step (e); then (g) formulating a lubricating composition comprising at least one of the product of step (f)(i), step (f)(ii), step (f)(i) followed by step (f)(ii), and step (f)(ii) followed by step (f)(i); a very much preferred embodiment of any of the previous wherein said polyolefin is characterized as a liquid polyolefin; also any of the previous wherein said solid sorbent is selected from the group consisting of silica, alumina, aluminosilicates, amorphous silicates, amorphous aluminates, titania, zirconia, magnesia, calcium oxides, natural, synthetic, or modified clays, zeolites, MCM41, diatomous earth, natural or synthetic cellulose material or any other solid with surface area and pore volume, and/or wherein said olefin monomer is selected from the group consisting of C3 to C30 alpha-olefins or ethylene with C3 to C30 alpha-olefins when ethylene is present in less than 50 wt %, and/or wherein said homogenous catalyst is metallocene catalyst is selected from the group consisting of Ti, Zr, Hf, Cr, activated with non-coordinating anion such as N,N-dimethylanilinium tetra(perfluorophenyl)borate, or aluminoxane, especially methyl aluminoxane, and optionally promoted with trialkylaluminum ortrialkylboroncompounds, or wherein said homogenous or colloidal catalyst is a transition metal complexed with diimide ligands, and wherein said transition metal is selected from the group consisting of Pd, Ni, Co, W, and Mo, and wherein said catalyst is activated with non-coordinating anion (particularly wherein said non-coordinating anion is selected from N,N-dimethylanilinium tetra(perfluorophenyl)borate and aluminoxane, preferably methyl aluminoxane, and optionally promoted with trialkylaluminum, or trialkylboron compounds); any of the previous further characterized in that the solid sorbent with residual catalyst is treated to desorb said residual catalyst to produce a product comprising solid sorbent without residual catalyst absorbed thereon and desorbed residual catalyst, said product can be used repeatedly to remove catalyst residual; embodiments wherein the sorbent is selected from the group consisting of natural or synthetic clay, modified clay, diatomaceous earth, activated charcoal, silica gel, alumina, aluminosilicate, zeolites, molecular sieves, cellulose material, metal oxides, metal salts, or mixture thereof, preferably having a surface area greater than 0.1 m$^2$/gram and with a pore volume greater than 0.01 cc/gram, and optionally further characterized by having an amount of water or moisture sufficient to act as a catalyst poison to deactivate the polymerization reaction, or wherein said sorbent is selected from the group consisting of silica, alumina, activated alumina, di-atomaceous earth, zeolites, natural or synthetic clay materials, micro crystalline material, powdered cellulose material with hydroxyl groups, and mixtures thereof. In other embodiments, the invention is characterized by an effluent comprising polyolefin prepared by a process according to any one of the preceding claims, and also by a solid sorbent comprising residual catalyst prepared by the process according to any one of the previous process descriptions

What is claimed is:

1. A process to produce liquid polyalpha-olefins comprising:
    (a) contacting at least one $C_8$ to $C_{30}$ alpha-olefin monomer with at least one activated homogeneous or colloidal polymerization catalyst wherein said catalyst is a metallocene catalyst comprising a transition metal selected from the group consisting of Ti, Zr, Hf, and Cr in a polymerization reactor to produce a product comprising at least one liquid polyalpha-olefin and residual catalyst;
    (b) adding a quench reagent to the product in an amount of 250 ppm or less, based on the total weight of the reactor content, to the solution product,
    (c) contacting said product comprising said liquid polyalpha-olefin with a solid sorbent slurry whereby, due to chemical and physical active sites on the solid sorbent, said solid sorbent absorbs at least a portion of said residual catalyst to produce a solid sorbent with residual catalyst;
    (d) separating said solid sorbent with residual catalyst from said at least one liquid polyalpha-olefin; and
    (e) recovering said at least one liquid polyalpha-olefin.

2. The process of claim 1, wherein said contacting in step (c) occurs by adding said solid sorbent slurry to the reactor used in step (a).

3. The process of claim 1, wherein said contacting in step (c) occurs by contact of said solid sorbent slurry and said product in a catalyst separation reactor separate from said polymerization reactor.

4. The process of claim 1, wherein said contacting in step (c) occurs by passing an effluent comprising said product through a bed or column comprising said solid sorbent slurry.

5. The process of claim 1, wherein step (d) comprising filtration.

6. The process of claim 1, said quench reagent is selected from the group consisting of C02, water, alcohol, air, sorbent, and catalyst poison.

7. The process of claim 1, wherein the residual catalyst is deactivated before a distillation step to remove at least one of: any un-reacted alpha-olefin monomer, a solvent, and/or at least one liquid polyalpha-olefin.

8. The process of claim 1, further comprising after step (e):
    (f) contacting at least a part of said at least one liquid polyalpha-olefin with at least one functionalizing species to produce a functionalized species.

9. The process of claim 8, wherein said functionalizing species is selected from the group consisting of aromatic compounds, benzene, toluene, xylenes, naphthalene, and alkylnaphthalene, maleic anhydride, organic amine, organic acid and alcohol.

10. The process of claim 1, further comprising after step (e):
    (f) fractionating the recovered liquid polyalpha-olefin into plural fractions, with at least one fraction comprising at least one liquid polyalpha-olefin;
    (g) then (i) hydrogenating at least a portion of said at least one liquid polyalpha-olefin from step (f), and/or (ii) functionalizing at least a portion of said at least one liquid polyalpha-olefin from step (f); then
    (h) formulating a lubricating composition comprising at least one of the product of step (g)(i), step (g)(ii), step (g)(i) followed by step (g)(ii), and step (g)(ii) followed by step (g)(i).

11. The process of claim 1, wherein said solid sorbent is selected from the group consisting of silica, alumina, aluminosilicates, amorphous silicates, amorphous aluminates, titania, zirconia, magnesia, calcium oxides, natural clays, synthetic clays, modified clays, zeolites, MCM41, diatomaceous earth, natural cellulose material, and synthetic cellulose material.

12. The process of claim 1, wherein said at least one alpha-olefin monomer further comprises ethylene in an amount less than 50 wt %.

13. The process of claim 1, wherein said catalyst is activated with aluminoxane, and optionally promoted with trialkylaluminum or trialkylboron compounds.

14. The process of claim 1, wherein said catalyst is activated with a non-coordinating anion or aluminoxane.

15. The process of claim 14, wherein said non-coordinating anion is N,N-dimethylanilinium tetra(perfluorophenyl)borate and the aluminoxane is methyl aluminoxane, and is optionally promoted with trialkylaluminum or trialkylboron compounds.

16. The process of claim 1, wherein said solid sorbent with residual catalyst is treated to desorb said residual catalyst to produce a product comprising solid sorbent without residual catalyst absorbed thereon and desorbed residual catalyst, said product can be used repeatedly to remove catalyst residual.

17. The process of claim 1, wherein said sorbent is selected from the group consisting of natural clay, synthetic clay, modified clay, diatomaceous earth, activated charcoal, silica gel, alumina, aluminosilicate, zeolites, molecular sieves, cellulose material, metal oxides, metal salts, and mixtures thereof.

18. The process of claim 1, wherein said sorbent is selected from the group consisting of silica, alumina, activated alumina, di-atomaceous earth, zeolites, natural clay materials, synthetic clay materials, micro crystalline material, powdered cellulose material with hydroxyl groups, and mixtures thereof.

19. The process of claim 1, wherein the quench reagent is not added to the solution product.

20. The process of claim 19, wherein said solid sorbent has a surface hydroxyl group or surface oxygen group.

21. The process of claim 1, wherein said solid sorbent has a surface area greater than 0.1 $m^2$/gram and a pore volume greater than 0.01 cc/gram.

22. The process of claim 1, wherein said at least one alpha-olefin monomer is at least one monomer selected from propylene, 1-butene, 1-pentene, 1-hexene, and 1-octene, and at least one monomer selected from $C_{12}$ to $C_{18}$ alpha-olefins.

23. The process of claim 1, wherein the quench reagent is added to the product in an amount selected from zero ppm, 100 ppm, or 250 ppm.

24. The process of claim 1, wherein the said at least one alpha-olefin monomer is selected from $C_8$ to $C_{20}$ linear alpha-olefins.

* * * * *